United States Patent
Sommer et al.

(10) Patent No.: US 7,488,765 B2
(45) Date of Patent: Feb. 10, 2009

(54) GUM ADHESIVE BASED ON A FILLED POLYMER DISPERSION

(75) Inventors: Oliver Sommer, Porta Westfalica (DE); Horst Buxhofer, Erkrath (DE); Nicolas De-Calmes, Dainville (FR); Ralf Gossen, Duisburg (DE); Sebastian Kotthoff, Porta Westfalica (DE); Hans-Juergen Wolter, Petershagen (DE); Ethel Abrahams-Meyer, Viersen (DE)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 0 days.

(21) Appl. No.: 11/850,773

(22) Filed: Sep. 6, 2007

(65) Prior Publication Data

US 2008/0058447 A1 Mar. 6, 2008

Related U.S. Application Data

(63) Continuation of application No. PCT/EP06/01150, filed on Feb. 9, 2006.

(30) Foreign Application Priority Data

Mar. 8, 2005 (DE) .................. 10 2005 010 446

(51) Int. Cl.
 *C08L 3/08* (2006.01)
 *C08L 1/26* (2006.01)
(52) U.S. Cl. .............................. 524/42; 524/48; 524/50
(58) Field of Classification Search .................. 524/42, 524/48, 50
 See application file for complete search history.

(56) References Cited

U.S. PATENT DOCUMENTS 4,532,295 A 7/1985 Brabetz et al.
5,433,775 A * 7/1995 Gardenier et al. ......... 106/206.1
6,538,057 B1 3/2003 Wildburg et al.
6,727,305 B1 4/2004 Bavez Aranguiz

FOREIGN PATENT DOCUMENTS

| DE | 33 23 851 A1 | 1/1985 |
|---|---|---|
| DE | 199 51 803 A1 | 5/2000 |
| DE | 199 59 916 A1 | 7/2000 |
| EP | 0 686 683 B1 | 11/1998 |
| EP | 0 879 864 A1 | 11/1998 |
| JP | 57 067608 | 4/1982 |
| JP | 2002 188069 | 7/2002 |
| WO | WO 98/11171 A1 | 3/1998 |
| WO | WO 00/27943 A1 | 5/2000 |

OTHER PUBLICATIONS

Patent Abstracts of Japan, vol. 2002, No. 11, Nov. 6, 2002 for JP 2002 188069 (Jul. 2002).
Database WPI Section Ch, Week 198222, Derwent Publications Ltd., Longon GB, Class A14, An 1982-44863E, XP002379418 for JP 57 067608 (Apr. 1982).
Plastics—Resins in the liquid state or as emulsions or dispersion—Determination of apparent viscosity by the Brookfield Test method, Normen-Download-Beuth-Henkel KGaA, ISO 2555, Second Edition Feb. 1, 1989, pp. 1-7.
Paints, varnishes and plastics—Determination of non-volatile-matter content, DIN Deutsches Institut Fur Normung e.V., Berlin, Beuth Berlag GmbH, DIN EN ISO 3251 (replaces DIN ISO 1625 which replaced DIN 53 189), pp, 1-9 (Jul. 2003).
International Search Report for WO 2006/094595 A1, Sep. 14, 2006.
DE3238232 (Abstract), 1984.
DE 19812131 (Abstract), 1999.

* cited by examiner

*Primary Examiner*—Robert D. Harlan
(74) *Attorney, Agent, or Firm*—Woodcock Washburn LLP

(57) ABSTRACT

A filled gum adhesive useful for producing remoistenable layers contains fillers, protective colloids, and a (co)polymer, wherein the (co)polymer is prepared by polymerizing one or more ethylenically unsaturated monomers in the presence of a dispersion of protective colloid and filler particles.

16 Claims, No Drawings

US 7,488,765 B2

GUM ADHESIVE BASED ON A FILLED POLYMER DISPERSION

CROSS-REFERENCE TO RELATED APPLICATIONS

This application is a continuation under 35 USC Sections 365(c) and 120 of International Application No. PCT/EP2006/001150, filed 9 Feb. 2006 and published 14 Sep. 2006 as WO 2006/094594, which claims priority from German Application No. 102005010446.0, filed 8 Mar. 2005, each of which is incorporated herein by reference in its entirety.

FIELD OF THE INVENTION

The invention relates to a filled gum adhesive based on a polymer dispersion stabilized with protective colloids, wherein said polymer dispersion was polymerized in the presence of organic or inorganic filler particles.

DISCUSSION OF THE RELATED ART

An adhesive based on a polyvinyl acetate dispersion and which is used as a gum adhesive is known from DE 199 51 803. However, this patent concerns an adhesive that consists of a stabilized pVAc dispersion and comprises a protective colloid based on non-ionic starch ethers and polyvinyl alcohol and at least one surface-active agent. In particular, the positive effect of the polyvinyl alcohol during the polymerization is described. Moreover, various dispersed or dissolved additives can also be added. The addition of pigments or fillers is not described.

In addition, it is known from DE 33 23 851 that adhesives can be used based on an aqueous polymer dispersion, manufactured from vinyl esters and additional ethylenically unsaturated compounds in the presence of starch ethers as the protective colloid. The polymerization in the presence of pigments or fillers is not described. Highly viscous dispersions are described that can also be processed in kneaders. These dispersions are used for manufacturing redispersible paste powders. A use as re-wettable gum adhesives is not described.

In addition, a polymer dispersion is known from DE 199 59916, which can be used as an adhesive in furniture manufacture or as a surface coating agent. In this case it is a filled polymer dispersion, in which at least one organic polymer is polymerized in the presence of filler particles, and which exhibits a specific ratio of the particle sizes of filler particles to polymer particles. The polymer is polymerized in the presence of a further water-soluble polymer, especially polyvinyl alcohol. The examples only contain polyvinyl alcohol as the protective colloid. A use of these polymer dispersions as a re-wettable gum adhesive is not described.

A requirement for gum adhesives is that essentially they should be manufactured with cheaply available raw materials, wherein the required properties such as blocking behavior, gloss, and setting time after re-wetting must be retained. In the field of gum adhesives, mixing polymer particles and fillers is disadvantageous because the dried adhesive layers become uneven and lose the required gloss. Moreover, these types of adhesives should be formulated with ingredients that meet food law requirements. Furthermore, it is difficult to convert polymer dispersions containing pigments or fillers into a storage stable form.

BRIEF SUMMARY OF THE INVENTION

Accordingly, the object of the present invention is to provide a gum adhesive that exhibits the required properties of a gum adhesive, such as resistance to blocking, smoothness, good processability, gloss, setting time after re-wetting, that is cost efficient and has a storage stable dispersion form.

The object is achieved by a gum adhesive comprising an aqueous filled polymer dispersion that comprises water, at least one filler, at least one (co)polymer based on olefinically unsaturated monomers, wherein the (co)polymer was polymerized in the presence of a starch ether derivative and/or cellulose ether derivative as the protective colloid, in the presence of the filler.

DETAILED DESCRIPTION OF CERTAIN EMBODIMENTS OF THE INVENTION

Gumming is understood to mean the coating of a carrier material with a water-reactivatable adhesive. The carrier material is generally a water absorbent product, especially made of paper or cardboard. It can be used, for example, as postage stamps, as envelopes, as labels, as adhesive strips, etc. The gum adhesive is applied in liquid form on the carrier material and immediately dried, thereby losing its tackiness. On moistening with water it becomes tacky again. The gum adhesives are usually based on, e.g., glutin or starch derivatives (dextrin). However, adhesives based on totally synthetic polymers are also known, e.g., from polyvinyl alcohol or polyvinyl acetate.

The subject of the invention is an adhesive dispersion for use as a gum adhesive, in which the polymer is manufactured in the presence of fillers and protective colloids. A further subject of the invention is a process for manufacturing stable, aqueous, filled adhesive dispersions by radical polymerization of monomers in the presence of fillers.

The inventive adhesive dispersion comprises inorganic fillers and/or organic fillers, optionally also mixtures of different fillers. In the context of the present invention, all organic or inorganic fillers with a particle size from about 0.05 to about 10 µm, for example 0.1 to 5 µm, or 0.2 to 4 µm, are suitable fillers. Fillers are also understood to mean optionally colored pigments, in so far as these are insoluble in the aqueous phase.

In the context of the present invention, the term "particle size" is understood to mean the conventional value "$d_{50}$", i.e., the value at which 50% of the particles exhibit a smaller diameter and about 50% of the particles have a larger diameter. For the determination of this value, measurement techniques are used that are based on the principle of light diffraction. The listed particle size data refer to measurements carried out with the MASTERSIZER 2000 instrument from Malvern Instruments.

In the context of the present invention, suitable fillers are inorganic materials that are inert towards the organic polymers as well as under the prevailing reaction conditions during the manufacturing process of the filled polymer dispersion. Examples of suitable inorganic materials are aluminum silicates, for example andalusite, sillimanite, kyanite, mullite, pyrophyllite or imogolite. Compounds based on sodium aluminum silicate or calcium silicate are also suitable. Also suitable are minerals, such as silica, quartz powder, silica gel, barium sulfate, metal oxides such as zinc oxide, titanium dioxide, zeolites, kaophyllite, leucite, potash feldspar, biotite, the group of soro-, cyclo-, ino-, phyllo- and tectosilicates, the group of poorly soluble sulfates, such as gypsum, anhydrite or heavy spar, and calcium minerals, such as talc or chalk. In the context of the present invention, the inorganic materials mentioned may be used individually, i.e. as the sole type of filler particles. However, a mixture of two or more of the compounds mentioned may equally well be used.

Furthermore, in the context of the present invention, the polymerization can proceed in the presence of solid particulate organic fillers. Suitable organic fillers are for example, polyvinyl acetate and copolymers; polystyrene and copolymers; polyolefins based on ethylene, propylene, and/or butene; polyacrylonitrile, poly(meth)acrylate esters, polydialkyl maleates and their copolymers.

In a preferred embodiment of the invention, the inventive filled polymer dispersions comprise inorganic fillers such as chalk, gypsum as the anhydrite, semi hydrate or dihydrate, quartz powder, silica gel, silica, titanium dioxide, talc or layered silicates.

The fillers used in the context of the invention can exhibit smooth, rough or porous surfaces; preferably the fillers exhibit a rough or a porous surface.

A particular embodiment of the invention uses fillers, whose filler particles exhibit a platelet form. "Platelet form" is understood to mean that the diameters of the length and breadth of the individual particles are significantly greater than the thickness of the particle. For example, the ratio of thickness: diameter should be maximum 1:3, particularly preferably maximum 1:10.

The quantity of fillers in the inventive adhesive dispersion should be 1 to 40 wt. %, preferably 5 to 20 wt. %.

An additional essential ingredient of the inventive filled polymer dispersion is the protective colloid, in the presence of which, together with the filler, the water-insoluble polymer is polymerized. The protective colloid concerns starch ethers and/or cellulose ethers or their derivatives, e.g., modified by oxidation, esterification, etherification, and/or degradation. Examples are hydroxyalkyl ether starches, hydroxyalkyl celluloses, carboxyalkyl celluloses, carboxyalkyl ether starches, dextrins or hydroxyalkyl dextrins. They can be used singly or in a mixture. Non-ionic protective colloids are particularly suitable, among which starch derivatives are preferred.

The hydroxyalkyl ether starches, e.g., hydroxyethyl ether starches, hydroxypropyl ether starches and hydroxybutyl ether starches, are particularly suitable non-ionic starch derivatives. In general, the alkyl groups comprise 2 to 8, particularly 2 to 4 carbon atoms. Both natural starches as well as degraded starches, e.g., starches degraded by acid hydrolysis, such as dextrins, can be used as the starting materials for the cited starch derivatives. A wide variety of starting products can be chosen. Thus, practically all starches of vegetal origin can be used, e.g., those from maize, wheat, potatoes, tapioca, rice, sago and millet. The degree of substitution of the OH groups is not critical for the success of the process, thus in many cases up to about 2 substitutions are sufficient, although a higher number of OH groups per sugar unit can be converted. These products are commercially available and can be selected according to their properties by a person skilled in the art.

Moreover, during the polymerization, polyvinyl alcohol can also be comprised as an additional ingredient in an amount of 0 to 20 wt. % as a further protective colloid in the dispersion. However, according to the invention the content is preferably kept low. Adhesive dispersions that are free of polyvinyl alcohol are particularly preferred. Also, no polyvinyl alcohol should be added to the adhesive in later process steps.

Non-ionic starch ethers are preferably used as the sole protective colloids, namely in an amount of 0.5 to 35 wt. %, preferably 3 to 30 wt. %, particularly 7 to 30 wt. %, based on the adhesive dispersion.

According to the invention, the adhesive dispersion comprises a (co)polymer of olefinically unsaturated monomers, which is obtained by polymerization in the presence of the filler. Here, discrete water-insoluble (co)polymers that can be obtained by radical polymerization of unsaturated monomers are particularly suitable, such as, e.g., vinyl ester polymers as homopolymers or copolymers, polyacrylic acid esters or polymethacrylic acid esters or copolymers. They can comprise various other copolymerizable monomers, although no halogenated monomers should be used, however.

For the copolymer, radically polymerisable monomers can be considered as the monomer, which comprise at least one ethylenically unsaturated group, such as for example ethylene; vinyl aromatic monomers, such as styrene, α-methylstyrene or vinyltoluene; esters of vinyl alcohol and $C_2$ to $C_{18}$ monocarboxylic acids, such as vinyl acetate, vinyl propionate, vinyl n-butyrate, vinyl laurate and vinyl stearate; esters of α,β-monoethylenically unsaturated mono- and dicarboxylic acids that preferably contain 3 to 6 carbon atoms, such as, in particular acrylic acid, methacrylic acid, maleic acid, fumaric acid and itaconic acid with $C_1$ to $C_{12}$ alkanols, such as the methyl, ethyl, n-butyl, iso-butyl and 2-ethylhexyl esters of acrylic acid and methacrylic acid, dimethyl maleate or di-n-butyl maleate or nitriles of α,β-monoethylenically unsaturated carboxylic acids, such as acrylonitrile. Low amounts of monomers that possess an additional functional group can be optionally comprised, like epoxy, hydroxy, N-functional groups, such as epoxy, hydroxy, N-methylol groups or at least two non-conjugated ethylenically unsaturated double bonds.

Vinyl esters of such olefinically unsaturated monomers are preferred (co)polymers, The (co)polymers can be manufactured by emulsion or suspension polymerization. For example, they are vinyl ester monomers based on linear or branched $C_2$ to $C_{12}$ carboxylic acids. Homopolymers or copolymers can be used. In particular, suitable copolymers can consist of vinyl acetate and 25 to 50 wt. %, based on the total monomers, of at least one mono or diester of fumaric, maleic, itaconic, crotonic, acrylic and/or methacrylic acid, wherein the alkyl group can be branched or unbranched and should comprise 4 to 18, particularly 4 to 8 carbon atoms. Preferred alkyl groups are selected from, e.g., butyl and ethylhexyl or octyl groups.

Terpolymers of the abovementioned comonomers can also be used. The third comonomer is then used in an amount of up to 10, preferably 0.1 up to 2 wt. %, based on the total comonomers.

Suitable processes for emulsion polymerization are described, for example, in "Comprehensive Polymer Chemistry", 4, 171-218 or in DE-OS 33 23 851. The polymerization should result in a solids content of the filled polymer dispersion of polymer, filler and protective colloid of 45 to 70 wt. %, preferably 50 to 65 wt. %, particularly 55 to 60 wt. %. In particular, the polyvinyl acetate can be manufactured by the suspension or emulsion polymerization process, the emulsion polymerization being preferred. These specific process conditions are generally known to the person skilled in the art.

Depending on the desired properties of the polymer particles and the type of manufacture, the fraction of polymers in the total adhesive dispersion can range between 5 and 60 wt. %. In a preferred embodiment of the invention, the fraction is between about 10 and about 35 wt. %.

In a further embodiment of the invention, the dispersion comprises up to about 20 wt. % of additives, based on the total adhesive dispersion. Exemplary additives include stabilizers, defoamers, antioxidants, photo stabilizers, pigment dispersants, wetting agents, pH adjustors, plasticizers and the like. In order to meet special requirements, auxiliaries can also be added, e.g., dyes, odorous substances, biocides, etc.

For example, the inventive gum adhesive can further comprise, based on the total adhesive dispersion, up to 10, particularly 1 to 5 wt. % of at least one hygroscopic material as an additive. This type of material is understood as one that on storage under normal conditions absorbs moisture from the air to attain a certain equilibrium. They are preferably organic substances such as, e.g., sugar, glycerol or polyethylene glycol.

Moreover, the inventive gum adhesive can further comprise, based on the total adhesive dispersion, 0.01 to 10 wt. %, of at least one surface-active material as an additive. These substances are understood to be those that reduce the interfacial tension to water, such as defoamers, surfactants, wetting agents. They generally comprise hydrophilic and hydrophobic, particularly lipophilic groups. A part of the interfacial active substances can be added prior to polymerization. They provide wetting, avoid foaming as well as stabilizing the fractions of polymers and fillers that by themselves are water-insoluble. Anionic, non-ionic or ampholytic surfactants, or mixtures of two or more of them can be used.

Exemplary suitable anionic surfactants are alkyl sulfates, alkyl, alkylaryl ether sulfates, such as alkylphenol ether sulfates, fatty alcohol-, fatty alcohol ether sulfonates, in particular alkyl sulfonates, alkylaryl sulfonates, taurides, esters and half esters of sulfosuccinic acid, which can be optionally ethoxylated, alkali metal and ammonium salts of carboxylic acids, for example of fatty acids, partial esters of phosphoric acid and their alkali metal and ammonium salts.

Exemplary ampholytic surfactants are long chain substituted amino acids such as N-alkyl-di(aminoethyl)glycine or N-alkyl-2-aminopropionic acid salts, betaines, such as N-(3-acylamidopropyl)-N,N-dimethyl ammonium salts or alkylimidazolium betaines.

Exemplary non-ionic surfactants are alkyl polyglycol ethers, alkylaryl polyglycol ethers, fatty alcohol polyglycol ethers, fatty alcohol EO/PO-adducts and alkylphenol EO/PO adducts, ethylene oxide/propylene oxide (EO/PO) block copolymers, preferably those with about 8 to about 50 EO or PO units, addition products of alkylamines, fatty and resin acids, alkyl polyglycosides containing linear or branched, saturated or unsaturated alkyl groups with on average 8 to about 24 carbon atoms and an oligoglycoside group, natural products and their derivatives such as lecithin, lanolin or sarcosine, linear organo(poly)siloxanes containing polar groups, in particular those with alkoxy groups with up to 10 carbon atoms and up to about 50 EO or PO groups.

In a preferred embodiment of the invention, the inventive polymer dispersion comprises as the non-ionic surfactant, e.g., nonylphenol ethoxylates, octylphenol ethoxylates, C12/14 fatty alcohol ethoxylates, oleylcetyl ethoxylates, C16/18 fatty alcohol ethoxylates, cetylstearyl ethoxylates, ethoxylated triglycerides, sorbitan monolaurate, sorbitan monooleate, sorbitan 30 EO monooleate, sorbitan 30 EO monostearate or a mixture of two or more thereof.

In a preferred embodiment of the invention, the filled polymer dispersion comprises at least one anionic or non-ionic surfactant, for example with a molecular weight of less than 600.

The inventive polymer dispersion can comprise interfacial active substances in an amount of 0.1 to about 10 wt. %, for example 0.2 to 5.0 wt. %, based on the total adhesive dispersion, particularly 0.5 to 4.0 wt. %.

Plasticizers can be optionally present as further additives, for example esters such as abietic acid esters, adipic acid esters, azelaic acid esters, benzoic acid esters, butyric acid esters, acetic acid esters, esters of higher fatty acids, esters of fatty acids with OH groups or epoxidized fatty acids, fatty acid esters and fats, glycolic acid esters, phosphoric acid esters, phthalic acid esters, propionic acid esters, sebacic acid esters, sulfonic acid esters, thiobutyric acid esters, trimellitic acid esters, citric acid esters, polyethylene- or polypropylene glycol dialkyl ethers, such as dimethyl- or diethyl ethers of diethylene glycol or dipropylene glycol, glycerin triacetate, as well as mixtures of two or more thereof. The asymmetric esters of the difunctional, aliphatic dicarboxylic acids are particularly suitable.

The inventive adhesive dispersion can comprise up to 2 wt. %, preferably up to 1 wt. % of UV stabilizers as additives. The hindered amine light stabilizers (HALS) are particularly suited as UV stabilizers.

In the context of the present invention, the filled polymer dispersion is manufactured by emulsion polymerization. In this process a dispersion of the filler particles is initially produced in water.

For example an aqueous solution of a surfactant/emulsifier is initially manufactured. Then, one or more starch ethers and/or cellulose ethers or their derivatives are added to this solution. This solution or dispersion is then homogenized, optionally also supported by heating.

In the context of this embodiment, the next process step involves the dispersion of the filler particles. For this, the filler particles are dispersed in the abovementioned solution, the dispersion being stirred until a best possible distribution of the filler agglomerates is achieved. The dispersion can be carried out with a high-speed stirrer, such as a dissolver. The temperature, the stirring speed or the added surfactant, can optionally influence the dispersion of the agglomerates. The completeness of the dispersion can be checked by measuring the particle size distribution. However, in the context of the inventive process, it is possible to use any other method for breaking down the possible agglomerates of filler particles into the primary particles. These include, for example the dispersion of the agglomerates by means of ultra sound or electro kinetic processes.

Once the filler particles have been sufficiently dispersed, then the emulsion polymerization can be carried out. Part of the monomer is added, for example, and after addition of a part of the initiators the polymerization is started by heating. While controlling the reaction temperature, the remaining monomers and initiator mixture can then be added drop wise.

All polymerization initiators that are capable of initiating a radical aqueous emulsion polymerization in the presence of the filler are suitable polymerization initiators for the preferred radical aqueous emulsion polymerization. They can be organic and inorganic initiators, e.g., organic peroxides, such as tert.-butyl hydroperoxide, cumyl hydroperoxide, butyl or dicumyl peroxide, benzoyl peroxide; inorganic peroxides, such as Na or K peroxydisulfate, peroxydisulfuric acid, hydrogen peroxide, sodium or potassium percarbonate; azo compounds such as diazo bis-isobutyronitrile or azo bis(amidinopropyl) dihydrochloride. Redox initiators are also suitable, i.e., systems consisting of oxidizing and reducing agents, e.g., peroxysulfate/metabisulfates, peroxysulfate/thiosulfates or organic peroxides/thiosulfates.

In the context of a preferred embodiment of the invention, hydrogen peroxide, sodium persulfate, potassium persulfate or ammonium persulfate are used as the water-soluble polymerization initiators. In general, the amount of the added polymerization initiator is 0.05 to 2.0 wt. %, based on the filled polymer dispersion.

In one embodiment, in order to obtain a complete reaction and to reduce the content of residual monomer, another portion of initiator, which can be the same as or different from the first initiator used, can be additionally added at the end of the reaction and a post reaction can be carried out at a higher temperature.

Further additives can be added to the thus manufactured filled polymer dispersion either before cooling or when hot. These can be chosen to influence specific properties of the final gum adhesive.

A storage stable dispersion that can be used as a gum adhesive is obtained from the manufacturing process. The inventive adhesive dispersion should have a viscosity below 15,000 mPas, particularly between 2000 and 7500 mPas, measured according to ISO 2555, Brookfield RVT, Spindle 4, 25° C. This dispersion should be storage stable for a period of 8 weeks, i.e., no precipitated filler particles shall be found.

The inventive gum adhesive is characterized by a fast drying when applied on the substrate. Surprisingly, it yields a glossy film. This has good blocking resistance and shows a rapid activation even for drying temperatures of more than 160° C. after wetting as well as a subsequent intensive bonding.

The inventive gum adhesive dispersion has a suitable viscosity and therefore a good processability. For further processing of the coated substrates, the applied adhesive layer demonstrates a good operational reliability in envelope-sealing machines when sealing envelopes as it is rapidly activated by wetting. The remaining properties are not impaired. The flatness of a test paper with a 40 μm thick adhesive film is good.

The invention is now described in detail in the examples.

The properties were determined as follows:

The viscosity was measured according to Brookfield in accordance with ISO 2555 under the following conditions:

RVT, Spindle 4, 20 rpm, 25° C.

The solids content was determined according to DIN 53189, method C, after 3 hours at 105° C. by weighing.

A 40 μ thick film was applied to writing paper and dried at room temperature. The adhesive film, dried at room temperature, was then exposed to temperatures of 150 to 200° C. for 10 seconds.

The wettability was determined by dampening the adhesive film with a moist sponge and the wetting behavior was visually evaluated.

The initial blocking was determined by coating writing paper with a 40 μm thick film using a coating knife and drying for 24 hours at room temperature. Sheets of paper were arranged in a pile, alternately coated and uncoated. The resulting pile was made up of 15 coated and 15 uncoated papers and covered above and below with cardboard. This pile was stored at 40° C. and 70% relative humidity under a weight of 1 kg. After 48 hours the weight was removed and the blocking was determined, i.e., whether the sheets of paper stuck to each other.

When no blocking was observed, the samples were once more stored for a further 48 hours in air with 5% increased humidity. This method was continued until blocking was observed.

The gloss was determined by applying a 40 μm thick adhesive film with a knife blade on paper in the machine direction and then drying for 24 hours. Gloss was then measured against a standard sample.

Examples:

|  | Material | Exp. I | Exp. II | Exp. III | Exp. IV |
|---|---|---|---|---|---|
| 1. | Deionized water | 22.2 | 24.0 | 24.0 | 24.0 |
| 2. | Trisodium phosphate | 0.05 | — | — | — |
| 2. | Sodium hydrogen carbonate | — | 0.05 | 0.05 | 0.05 |
| 3. | AVEDEX 36 LAC 14 | 22.0 | — | — | — |
| 3. | SOLFAREX A 55 | — | 12.0 | 12.0 | 12.0 |
| 4. | DISPONIL AES 72 | 1.0 | 2.5 | 2.5 | 2.5 |
| 4. | ARKOPAL N 100 | — | 2.0 | 2.0 | 2.0 |
| 5. | FOAMASTER 223 | 0.05 | 0.05 | 0.05 | 0.05 |
| 6. | OMVACARB 2 GU | 10.0 | 10.0 | 10.0 | — |
| 6. | CALCIPORE HM | 10.0 | 10.0 | 10.0 | 10.0 |
| 7. | Vinyl acetate monomer | 19.0 | 19.0 | 19.0 | 19.0 |
| 8. | Hydrogen peroxide | 0.9 | — | — | — |
| 8. | Potassium persulfate | — | 0.15 | 0.15 | 0.15 |
| 9. | Sodium thiosulfate | 0.2 | — | — | — |
| 10. | Deionized water | 3.5 | 4.25 | 4.25 | 4.25 |
| 11. | Ammonium persulfate | 0.25 | 0.1 | — | 0.1 |
| 11. | tert.-Butyl hydroperoxide | — | — | 0.1 | — |
| 12. | Deionized water | 0.15 | 0.3 | 0.3 | 0.3 |
| 13. | FOAMASTER 223 | 0.05 | 0.05 | 0.05 | 0.05 |
| 14. | Ascorbic acid | 0.2 | 0.05 | 0.05 | 0.05 |
| 15. | Deionized water | 1.25 | 0.3 | 0.3 | 0.3 |
| 16. | Sodium hydroxide 50% | 0.2 | — | — | — |
| 17. | AVEDEX 48 MC1 4 | 4.25 | — | — | — |
| 18. | AVEDEX 36 LAC 14 | 4.25 | 17.75 | 17.75 | 17.75 |
| 19. | Polyglycol 200 | 0.8 | 0.75 | 0.75 | 0.75 |
| 19. | Glycerine triacetate | — | 2.5 | 2.5 | 2.5 |
| 20. | Sugar | 3.5 | 3.5 | 3.5 | 3.5 |
| 21. | FOAMASTER 223 | 0.2 | 0.25 | 0.25 | 0.25 |

AVEDEX 36 LAC14 Dextrin
AVEDEX 48 MC 14 Dextrin
SOLFAREX A 55 Dextrin-hydroxyl ether
DISPONIL AES 72 surfactant based on aryl/alkyl glycol polyether sulfate
ARKOPAL N 100 surfactant based on ethoxylated phenols
FOAMASTER 223 defoamer based on silicone reaction products
OMYACARB 2 GU chalk ($d_{50}$ 2.5 μm)
CALCIPORE HM chalk ($d_{50}$ 0.65 μm)

Solution 1:

Components 1, 4 and 5 were placed in a mixing container and mixed, component 2 was added and component 3 was added in portions into the cold solution and homogenized. Component 6 was slowly stirred into this mixture such that an adequate dispersion was obtained and the filler does not precipitate out. The mixture was then homogenized and stirred for one hour at about 80° C.

Solution 2:

Components 8 and optionally 9 were slowly stirred with cooling into the water (component 10).

Solution 3:

Components 13 to 15 were mixed.

Polymerization:

Solution 1 was added into a preheated reactor and heated. Approximately 10% of component 7 (olefinic monomer) was then metered in at 72-82° C. as well as 10% of solution 2 (each based on the total amount). Once the polymerization reaction had started, the remaining amount of the monomer was slowly metered in, and in parallel the solution 2 was also metered in. The reaction temperature was maintained between 75 and 80° C.

After the monomer and the solution 2 had been added, stirring was continued until the temperature maximum was exceeded. A mixture of components 11 and 12 was then slowly added at a temperature below 85° C. After about 10 minutes, the solution 3 was metered in over a period of 15 minutes, causing the reaction temperature to increase once again to about 90° C. The mixture was held at this temperature for 30 minutes.

The solution was then cooled to about 60° C., thereby ending the polymerization reaction.

Adhesive dispersion:

The components 16, 17, and 18 (when present) were slowly added sequentially to the still warm reaction solution and stirred for 30 minutes. Then 19, 20 and 21 were added with stirring, homogenized and cooled down to a temperature of <30° C.

|                 | Exp. I  | Exp. II | Exp. III | Exp. IV |
|-----------------|---------|---------|----------|---------|
| Solids          | 64.79%  | 67.1%   | 65.8%    | 67.0%   |
| pH              | 5.7     | 6.3     | 6.4      | 6.3     |
| Viscosity (mPas)| 3750    | 11500   | 10000    | 10500   |

After application on paper and drying, the adhesives exhibit a glossy and flat surface. The wettability on re-wetting was good.

A blocking test was carried out. Blocking was not observed up to a humidity of 75%.

The dispersion, even with low viscosity, was stored at room temperature for more than 8 weeks without any precipitation of the filler particles.

What is claimed is:

1. A gum adhesive comprising an aqueous filled polymer dispersion that comprises water, at least one inorganic filler, and at least one polymer comprising a homopolymer or copolymer of vinyl acetate, wherein the polymer was polymerized in the presence of at least one protective colloid selected from the group consisting of starch ethers, cellulose ethers and derivatives thereof and the filler, and wherein the dispersion has a viscosity below 15,000 mPas at a temperature of 25° C.

2. A gum adhesive according to claim 1, wherein the polymer dispersion is free of polyvinyl alcohol.

3. A gum adhesive according to claim 1, wherein the protective colloid is a non-ionic starch derivative.

4. A gum adhesive according to claim 1, wherein the protective colloid is non-ionic.

5. A gum adhesive according to claim 1, wherein the protective colloid is selected from the group consisting of hydroxyalkyl ether starches.

6. A gum adhesive according to claim 1, wherein the protective colloid is selected from the group consisting of hydroxyalkyl starches and hydroxyalkyl dextrins.

7. A gum adhesive according to claim 1, wherein one or more non-ionic starch ethers are used as the sole protective colloid in an amount of from 7 to 30 weight percent based on the polymer dispersion.

8. A gum adhesive according to claim 1, wherein said at least one inorganic filler is selected from the group consisting of chalk, gypsum, quartz powder, silica gel, silica, titanium dioxide, talc and layered silicates.

9. A gum adhesive according to claim 1, wherein the polymer is water-insoluble.

10. A gum adhesive according to claim 1, wherein the at least one inorganic filler is selected from the group consisting of fillers in the form of platelets with a particle size between 0.1 and 5 μm.

11. A gum adhesive according to claim 1, comprising inorganic filler(s) in an amount of 1 wt. % to 40 wt. % and protective colloid(s) in an amount of 3 wt. % to 30 wt. %.

12. A gum adhesive according to claim 1, additionally comprising one or more surfactants selected from the group consisting of non-ionic surfactants and anionic surfactants.

13. A gum adhesive according to claim 1, additionally comprising one or more plasticizers.

14. A gum adhesive according to claim 1, additionally comprising one or more defoamers.

15. Paper coated with a gum adhesive according to claim 1.

16. A process for manufacturing a gum adhesive according to claim 1, comprising forming an aqueous dispersion of said at least one inorganic filler and said at least one protective colloid, combining one or more monomers and initiator with said aqueous dispersion, and polymerizing said one or more monomers in the presence of said at least one inorganic filler and said at least one protective colloid.

* * * * *